May 3, 1966     F. H. FISHER ETAL     3,249,684

TERMINAL END CLAMP FOR AN ARMORED ELECTRICAL CABLE

Filed Sept. 17, 1963

FREDERICK H. FISHER,
CHARLES S. MUNDY,
INVENTORS.

By W. Glenn Jones

ATTORNEY.

United States Patent Office 3,249,684
Patented May 3, 1966

3,249,684
TERMINAL END CLAMP FOR AN ARMORED ELECTRICAL CABLE
Frederick H. Fisher and Charles S. Mundy, La Jolla, Calif., assignors to the United States of America as represented by the Secretary of the Navy
Filed Sept. 17, 1963, Ser. No. 309,585
6 Claims. (Cl. 174—75)

This invention relates generally to clamps adapted to connect a load to an armored electrical cable and particularly to an armored cable terminating clamp wherein the full working strength of such type of cable may be utilized for the support of a load without disturbing the electrical conductors mounted coaxially therein.

In oceanographic work, it is frequently found necessary to support considerable loads at great depths which loads may contain electrical apparatus requiring electrical connection to the surface vessel monitoring the instruments or electrical devices contained in the load vehicle. The use of wire or chain cables with external conductors has been found generally unsuitable at the greater depths.

It was early recognized that properly armored cables with the conductors protected within the cable could be manufactured for such purposes. The modes of attachment of such cables, however, to the load on the controlling surface vessel or buoy left much to be desired. Since the then known clamps, which were applied wholly externally of the cable covering, utilized only a portion of the strength members with an uneven stress distribution on the individual cable strain members, it became increasingly apparent that such clamps were greatly deficient causing undue flexing of the cable with consequent breakage and damage to the electrical conductors.

In order to obviate such difficulties and disadvantages and to utilize such armored cables to their full working strength, the herein described uniclamp was devised.

The principal object of this invention, therefore, is to provide an armored cable terminal clamp for connecting such cable to a load wherein the full strength of the cable's strain member may be utilized.

Another object is to provide an armored cable terminal clamp that can be applied to connect a load to such cable without limiting or endangering its electrical characteristics.

A further object of this connection is to provide an armored cable terminal clamp for connecting the cable to a load which may be economically constructed with a minimum number of parts and possesses increased facility of correction to the cable.

Other objects, advantages, and novel features of the invention will become apparent from the following detailed description of the invention when considered in conjunction with the accompanying drawings wherein.

Figure 1:
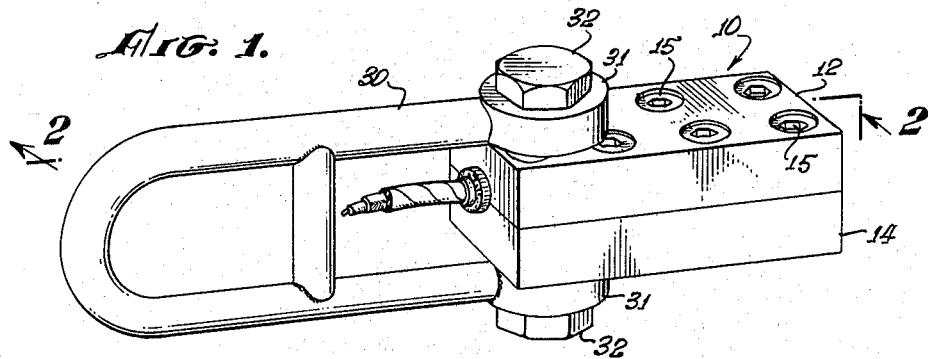
FIGURE 1 is a perspective view in elevation of the invention.

The improved clamp 10 consists of a longitudinally split clamping block 12 having upper and lower clamping members 13 and 14. These clamping members 13 and 14 are held together by a plurality of socket-headed cap screws 15. The split clamping block is provided with a central aperture 16 which is made parallel to the split, and extends the length of the block. The aperture has a cylindrical portion with a predetermined diameter which is slightly less than the outside diameter of the cable to be used. Toward the load end of the clamp, approximately one-third of this central aperture is tapered outwardly until its maximum diameter 17 is slightly larger than that of the cable. The cylindrical and tapered portions of the clamping members 13 and 14 are constructed to meet at a common plane.

Figure 2:
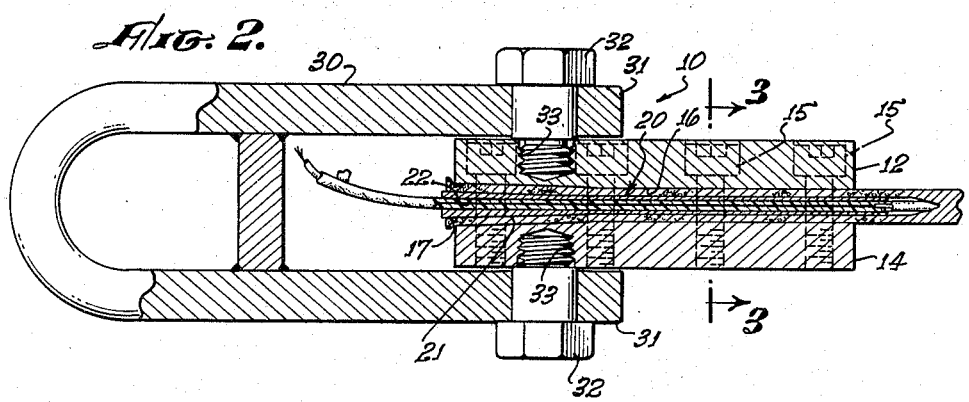
FIG. 2 is a cross-sectioned elevation taken on the line 2—2 of FIG. 1.
Figure 3:
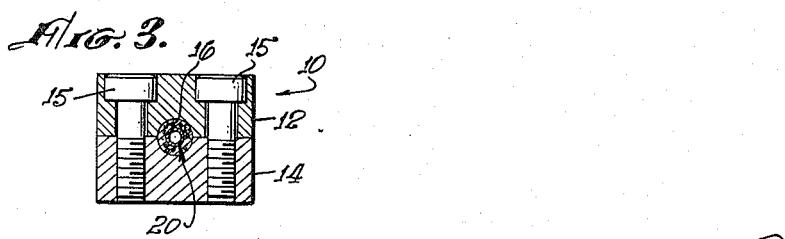
FIG. 3 is a cross-sectioned view taken on the line 3—3 of FIG. 2.
Figure 4:
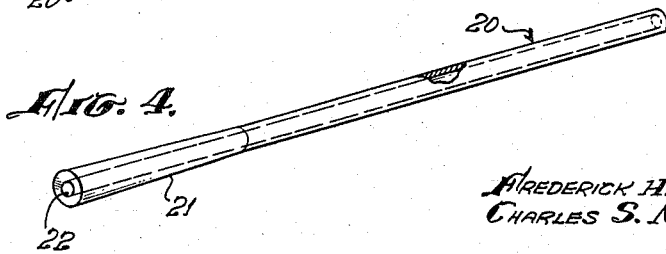
FIG. 4 is a partly-sectioned perspective view of one element of the invention.

The other member of the clamping structure per se, is the hollow spindle 20 which has a cylindrical and a tapered portion which meet at a common plane. The cylindrical portion has a predetermined external diameter which is substantially equal to the inside diameter of the cable strain members. As shown in FIG. 2, this spindle is made somewhat longer than the split clamping block and is externally tapered outwardly at the load end for a length and with a taper corresponding to the tapered length in the clamping block. This external spindle taper 21 is shown in FIGS. 2 and 4. The internal diameter 22 is made sufficiently smaller to accept only the electrical conductor(s) carried coaxially of the cable.

A bail 30 is provided at the load connecting end of the clamping block for connecting the clamp to the load. This bail is provided with eyelets 31. Bolts 32 pass through these eyelets and bed into shallow threaded apertures 33 which are formed in clamping members 13 and 14.

In use, the end of the cable is carefully cut away exposing a desired length of the centrally disposed electrical conductor. The hollow spindle is then inserted over the conductor and gently tapped into the cable between the conductor and the inner side of the armor or strain members until its outwardly tapered end coincides approximately with the exposed end of the armored cable. The cable is then laid in the half aperture in the bottom block or clamping member with the end of the cable in the tapered end of the aperture. The upper clamping member is then laid on top of the cable and the holding screws 15 inserted. The bail 30 is then employed and the cable can be connected to the load. Obviously, as the load increases, the wedging effect upon the strain members of the cable increases and, since the tapered spindle forcing the cable strain members into the tapered end of the central aperture results in a uniform stress distribution throughout the strain members, the maximum strength of the cable can be realized.

Having thus described our invention, we claim:
1. A terminal end clamp for an armored electrical cable comprising, in combination:
a longitudinally split clamping block having upper and lower matching members;
means securing said upper and lower matching members in matched aligned relationship;
a centrally disposed aperture formed in said clamping block for the reception of the armored cable, said aperture being cylindrical at one end of said clamping block and tapered at the other end of said block; and
a hollow spindle disposed between the clamping block and adapted to be inserted concentrically under the armor of said armored cable, said spindle having a cylindrical and a tapered portion, said cylindrical portion having a predetermined external diameter which is substantially equal to the inside diameter of the cable strain members and said tapered portion having a taper which is substantially equal to the female taper formed in said split clamping block.
2. A terminal end clamp for an armored electrical cable as claimed in claim 1 further characterized by said centrally disposed aperture being cylindrical throughout substantially two-thirds of its length and flared outwardly for substantially one-third of its length with a converg- ing taper corresponding to the external taper formed on said hollow spindle.

3. A terminal end clamp for an armored electrical cable as claimed in claim 1 further characterized by said hollow spindle being cylindrical throughout substantially two-thirds of its length and tapered outwardly throughout substantially one-third of its length with a taper corresponding to the said taper formed in said clamping block.

4. A terminal end clamp for an armored electrical cable having a centrally disposed coaxial electrical conductor portion as claimed in claim 1 further characterized by said hollow spindle being provided with a bore extending throughout its length, said bore being adapted to receive only said electrical conductor portion.

5. A terminal end clamp for armored electrical cables as claimed in claim 1 further characterized by being provided with means for attaching said clamping block to a supporting structure at the upper end of said cable.

6. A terminal end clamp for an armored electrical cable of the type having a centrally disposed conductor comprising:

a longitudinally split clamping block having upper and lower matching members;

means for securing said upper and lower matching members in matched aligned relationship;

a centrally disposed aperture formed in said clamping block for the reception of the armored cable, said aperture having a cylindrical and a tapered portion which meet at a common plane, said cylindrical portion having a predetermined diameter which is slightly less than the outside diameter of said cable;

a hollow spindle disposed between the clamping block and having a bore for receiving only the cable's centrally disposed conductor and being insertable under the cable armor, said spindle having a cylindrical and a tapered portion which meet at a common plane, said cylindrical portion having a predetermined external diameter which is substantially equal to the inside diameter of the cable strain members and said tapered portion having a taper which is substantially equal to the female taper formed in said split clamping block whereby the cable with the spindle inserted can be received within the clamping block aperture; and the cylindrical portion of each of the clamping block aperture and the spindle being substantially two-thirds of their respective lengths and the tapered portion of each of the clamping block aperture and the spindle being substantially one-third of their respective lengths.

References Cited by the Examiner

UNITED STATES PATENTS

| | | | |
|---|---|---|---|
| 2,198,093 | 4/1940 | Smithe | 174—79 |
| 2,697,739 | 12/1954 | Presswell | 174—70 |
| 2,886,626 | 5/1959 | Burnett et al. | 174—70 X |
| 2,963,536 | 12/1960 | Kokalas | 174—65 X |

FOREIGN PATENTS 178,648  4/1922  Great Britain.

ROBERT K. SCHAEFER, *Primary Examiner.*

E. JAMES SAX, *Examiner.*

W. B. FREDRICKS, *Assistant Examiner.*